US008219761B2

(12) United States Patent
Bercovich et al.

(10) Patent No.: US 8,219,761 B2
(45) Date of Patent: Jul. 10, 2012

(54) MULTI-PORT HIGH-LEVEL CACHE UNIT AND A METHOD FOR RETRIEVING INFORMATION FROM A MULTI-PORT HIGH-LEVEL CACHE UNIT

(75) Inventors: Ron Bercovich, Kfar-Saba (IL); Odi Dahan, Oranit (IL); Norman Goldstein, Ariel (IL); Yehuda Nowogrodski, D.N. SDE Gat (IL)

(73) Assignee: Freescale Semiconductor, Inc., Austin, TX (US)

( * ) Notice: Subject to any disclaimer, the term of this patent is extended or adjusted under 35 U.S.C. 154(b) by 577 days.

(21) Appl. No.: 12/094,123

(22) PCT Filed: Nov. 17, 2005

(86) PCT No.: PCT/IB2005/053804
§ 371 (c)(1),
(2), (4) Date: May 16, 2008

(87) PCT Pub. No.: WO2007/057726
PCT Pub. Date: May 24, 2007

(65) Prior Publication Data
US 2008/0256297 A1    Oct. 16, 2008

(51) Int. Cl.
*G06F 12/00*    (2006.01)
(52) U.S. Cl. ........ 711/149; 711/118; 711/119; 711/120; 711/122; 711/127; 711/131; 711/138
(58) Field of Classification Search .................. 711/118, 711/119, 120, 122, 127, 131, 138, 149
See application file for complete search history.

(56) References Cited

U.S. PATENT DOCUMENTS

| | | | |
|---|---|---|---|
| 5,276,848 A | | 1/1994 | Gallagher et al. |
| 5,581,734 A | * | 12/1996 | DiBrino et al. ............... 711/169 |
| 5,752,264 A | | 5/1998 | Blake et al. |
| 6,119,202 A | | 9/2000 | Borkenhagen et al. |
| 6,564,299 B1 | * | 5/2003 | Auracher ...................... 711/138 |
| 6,591,345 B1 | | 7/2003 | Seznec |
| 6,745,293 B2 | | 6/2004 | Lasserre et al. |
| 6,751,706 B2 | | 6/2004 | Chauvel et al. |
| 6,795,078 B2 | | 9/2004 | Lavelle et al. |

(Continued)

FOREIGN PATENT DOCUMENTS
EP    0637799 A2    2/1995
(Continued)

*Primary Examiner* — Jared Rutz
*Assistant Examiner* — Gurtej Bansal (57) ABSTRACT

A device that includes multiple processors that are connected to multiple level-one cache units. The device also includes a multi-port high-level cache unit that includes a first modular interconnect, a second modular interconnect, multiple high-level cache paths; whereas the multiple high-level cache paths comprise multiple concurrently accessible interleaved high-level cache units. Conveniently, the device also includes at least one non-cacheable path. A method for retrieving information from a cache that includes: concurrently receiving, by a first modular interconnect of a multiple-port high-level cache unit, requests to retrieve information. The method is characterized by providing information from at least two paths out of multiple high-level cache paths if at least two high-level cache hit occurs, and providing information via a second modular interconnect if a high-level cache miss occurs.

20 Claims, 9 Drawing Sheets

U.S. PATENT DOCUMENTS

| | | | |
|---|---|---|---|
| 2001/0042189 A1* | 11/2001 | Babaian et al. | 712/23 |
| 2003/0142101 A1 | 7/2003 | Lavelle et al. | |
| 2003/0177333 A1* | 9/2003 | John | 711/207 |
| 2004/0230745 A1 | 11/2004 | Navarro et al. | |
| 2005/0021912 A1* | 1/2005 | Ho et al. | 711/137 |
| 2005/0060457 A1* | 3/2005 | Olukotun | 710/240 |
| 2005/0129043 A1* | 6/2005 | Konda | 370/412 |
| 2005/0188119 A1* | 8/2005 | Hayden | 710/22 |
| 2007/0016729 A1* | 1/2007 | Correale et al. | 711/128 |

FOREIGN PATENT DOCUMENTS

| | | | |
|---|---|---|---|
| EP | 0843261 A2 | 5/1998 | |

* cited by examiner

CACHEABLE AREA START ADDRESS 151
CACHEABLE AREA START ADDRESS REGISTER 131

CACHEABLE AREA END ADDRESS 152
CACHEABLE AREA END ADDRESS REGISTER 132

CACHEABLE AREA ENABLE 153
CACHEABLE AREA ENABLE REGISTER 133

SWEEP START PHYSICAL ADDRESS 154
SWEEP START PHYSICAL ADDRESS REGISTER 134

SWEEP ENABLE 155 | SWEEP END PHYSICAL ADDRESS 156 | GLOBAL SWEEP 157
SWEEP END PHYSICAL ADDRESS REGISTER 135

ERROR, INTERRUPT, BURST SIZE, DEBUG 166
CONTROL REGISTER 136

VALID LINE 167
VALID LINE REGISTER 137

VALID VBRs 168
VALID VBR REGISTER 138

LINE REPLACEMENT MECHANISM 169
LINE REPLACEMENT MECHANISM REGISTER 139

MULTI-PORT HIGH-LEVEL CACHE UNIT AND A METHOD FOR RETRIEVING INFORMATION FROM A MULTI-PORT HIGH-LEVEL CACHE UNIT

FIELD OF THE INVENTION

The present invention relates to multi-port high-level cache units and to methods for retrieving information from multi-port high-level cache units.

BACKGROUND OF THE INVENTION

Modern electrical devices usually include one or more processors (also referred to as cores). Multi-processor devices, such as but not limited to systems on chips, include multiple memory units. The memory units usually include level-one cache units, level-two cache units, external memories and the like. Level-one cache units are usually dedicated to a single processor while higher-level cache units, such as high-level cache units are shared between multiple processors.

Various prior art multiple level cache units and methods for retrieving information from cache units are known in the art. The following U.S. patents and patent applications, all being incorporated herein by reference, provide an illustration of some of the prior art methods and devices:

U.S. Pat. No. 6,119,202 of Borkenhagen et al.; U.S. Pat. No. 6,795,078 of Lavelle et al.; U.S. Pat. No. 5,276,848 of Gallagher et al.; U.S. Pat. No. 5,752,264 of Blake et al.; U.S. Pat. No. 6,751,706 of Chauvel et al.; U.S. Pat. No. 6,745,293 of Lasserre et al.; U.S. Pat. No. 6,591,345 of Seznec; U.S. patent application publication serial number 2003142101 of Lavelle et al.; and U.S. patent application publication serial number 2004230745 of Navarro.

Modern devices are required to complete more complex tasks in less time then their predecessors. In many devices the number of processors was increased in order to cope with these requirements. This increment forces designers to design efficient information retrieval methods and devices.

The design process of modern integrated circuits is more complex then older generation design process. On the other hand, the design process period should be shortened in response to previous design process periods. In order to meet those two virtually contradicting demands there is a need to re-use as many designed components as possible.

Thus, there is a need to provide a multi-port cache unit that can be easily adapted to different environments, while re-using as many components as possible.

SUMMARY OF THE PRESENT INVENTION

A multi-port cache unit and a method for retrieving information from a multi-port cache unit, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following figures illustrate exemplary embodiments of the invention. They are not intended to limit the scope of the invention but rather assist in understanding some of the embodiments of the invention. It is further noted that all the figures are out of scale.

Conveniently, the multi-port cache unit is shared between multiple components (such as but not limited to multiple processors). Thus, it is a high-level cache memory and not a first-level cache unit. For convenience of explanation and without limiting the scope of the invention, the following description refers to a level-two (L2) cache.

According to an embodiment of the invention a device is provided. The device includes multiple processors that are connected to multiple level-one cache units. The device also includes a multi-port high-level cache unit that includes a first modular interconnect, a second modular interconnect (100'), multiple high-level cache paths. The multiple high-level cache paths include multiple concurrently accessible interleaved high-level cache units. Conveniently, the device also includes at least one non-cacheable path.

According to an embodiment of the invention a method is provided. The method for retrieving information from a multi-port high-level cache includes concurrently receiving, by a first modular interconnect of a multiple-port high-level cache unit, requests to retrieve information, and providing information from at least two paths out of multiple high-level cache paths if at least two high-level cache hits occur, and providing information via a second modular interconnect if a high-level cache miss occurs.

By using modular interconnects the multi-port cache unit can be easily re-designed such as to support more of fewer masters and/or slaves.

Figure 1:
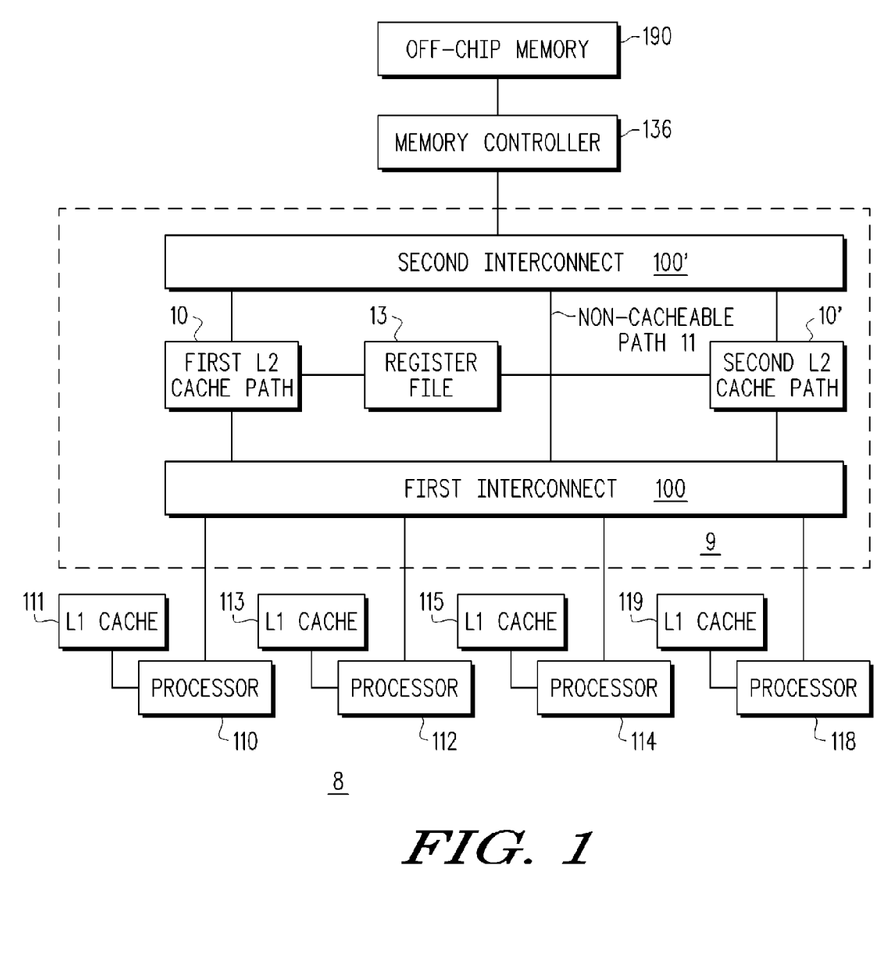
FIG. 1 illustrates a device that includes a modular multi-port cache unit according to an embodiment of the invention.
Figure 2:
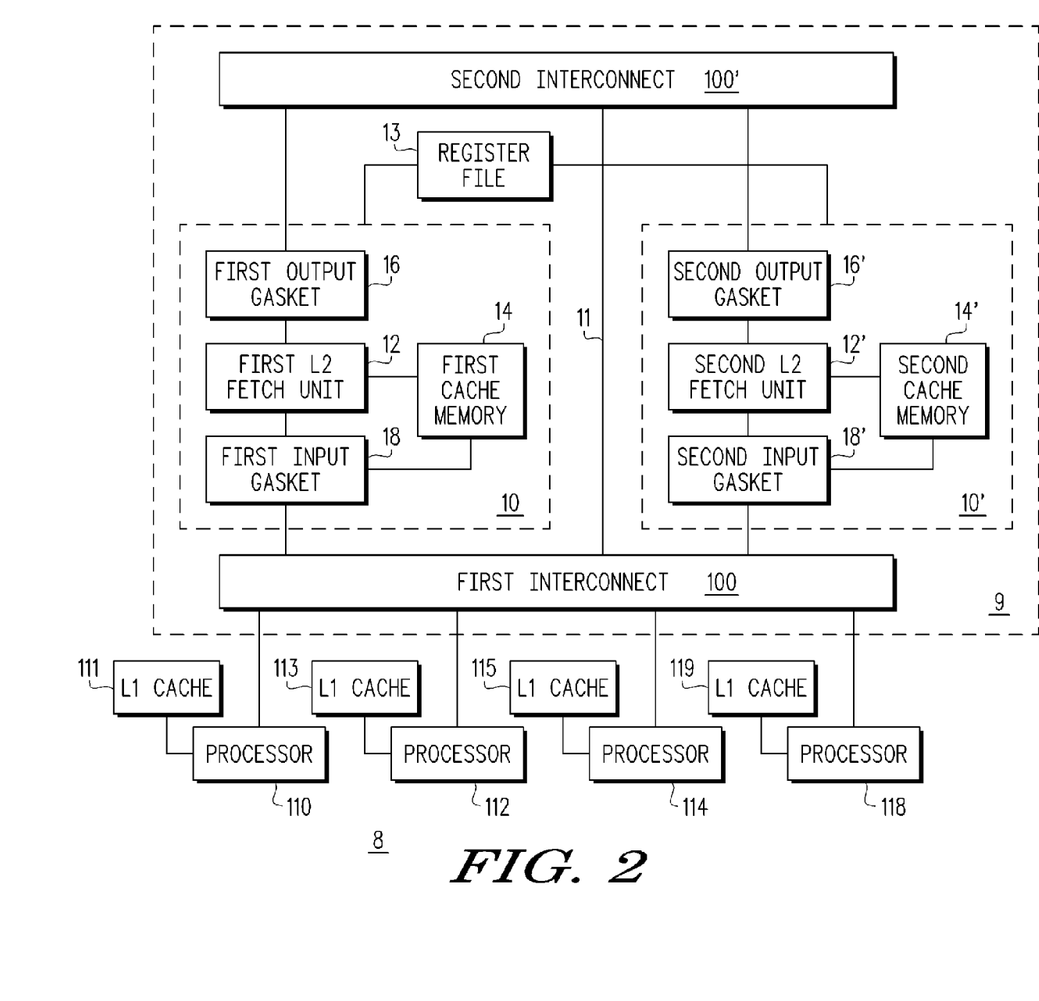
FIG. 2 illustrates a device that includes a modular multi-port cache unit according to an embodiment of the invention.

FIG. 1 illustrates a device 8 that includes a modular multi-port cache unit 9, according to an embodiment of the invention. FIG. 2 is a more detailed illustration of device 8, according to an embodiment of the invention.

Device 8 can include one or more integrated circuits, and can include one or more voltage supply units, can be a mobile device such as but not limited to a cellular phone, a laptop computer, a personal data accessory and the like.

Device 8 includes multiple processors 110, 112, 114 and 118. Each of these processors is connected to a level-one cache. Processor 110 is connected to level one (L1) cache 111. Processor 112 is connected to L1 cache 113. Processor 114 is connected to L1 cache 115. Processor 118 is connected to L1 cache 119.

Processors 110-118 can concurrently access the multi-port cache unit 9. The multi-port cache unit 9 is also connected to a memory controller 136 that in turn is connected to an off chip memory 190. It is noted that the multi-port cache unit 9 can be connected to more than a single higher level memory (including, for example higher level cache units, higher level non-cache units) and can be connected to multiple memory controllers.

For simplicity of explanation FIG. 1 illustrates four processors 110-118, a single memory controller 136, two cache paths (10 and 10') and a single non-cacheable path 11. Those of skill in the art will appreciate that the number of processors, cache paths, non-cacheable paths and higher level memory units (or interfaces) can differ from those illustrated in FIG. 1, without departing from the spirit of the invention.

Multi-port level-two cache unit 9 includes a first modular interconnect 100, a second modular interconnect 100', two level-two cache paths 10 and 10', non-cacheable path 11, and register file 13.

The register file 13 is connected to the first and second cacheable paths 10 and 10'. Each path out of paths 10, 10' and 11 is connected between the first modular interconnect 100 and the second modular interconnect 100'. The second modular interconnect 100' is connected to the memory controller 136.

First cache path 10 includes a first level-two (L2) fetch unit 12 that is connected between a first output gasket 16, a first input gasket 18 and a first cache unit 14. Second cache path 10' includes a second level-two (L2) fetch unit 12' that is connected between a second output gasket 16', a second input gasket 18' and a second cache unit 14'.

The entries of the cache units are two hundred and fifty six bytes long. They are arranged in an interleaved manner such that the eighth bit of the address of a requested memory entry determines which cache path (10 or 10') to select. It is noted that other sized entries and other digits can be used for selecting between the different cache paths.

Conveniently, cache unit 14 is an eight way associative cache, includes thirty-two (5 bits) cache index, has a one hundred and twenty eight bit valid bit resolution (one hundred and twenty eight bits form a VBR), and has a one hundred and twenty eight bit wide bus. It is noted that other cache units having different configurations can be used without departing from the scope of the invention.

Referring to FIG. 2, the first cache path 10' includes a first output gasket 16 and a first input gasket 18. These optional gaskets are adapted to compensate for differences in various protocols that are used by different components.

Conveniently, the first modular interconnect 100 is a non-blocking full fabric switch that supports per-path (10, 10', 11) arbitration. The second modular interconnect 100' is a non-blocking full fabric switch.

The number of paths (10, 10' and 11) as well as the internal configuration of each modular interconnect can be easily adjusted (during the design process of the device) to the number of processors, to the number of paths and the like.

Conveniently, the register file 13 includes at least one cacheable address range register such as registers 131-133 that define at least one cacheable address range.

Conveniently, each modular interconnect out of the first and second modular interconnects 100 and 100' includes multiple interconnect components such as but not limited to splitters 500(1), 500(2), 500(3) and 500', arbiter and multiplexers 800(1), 800(2), 800(3) and 800, and expanders 600(1), 600(2), 600(3), 600(4), and 600'.

Conveniently, the number of modular interconnect components is responsive to the amount of non-interconnect components that are connected to the modular interconnect.

Figure 3:
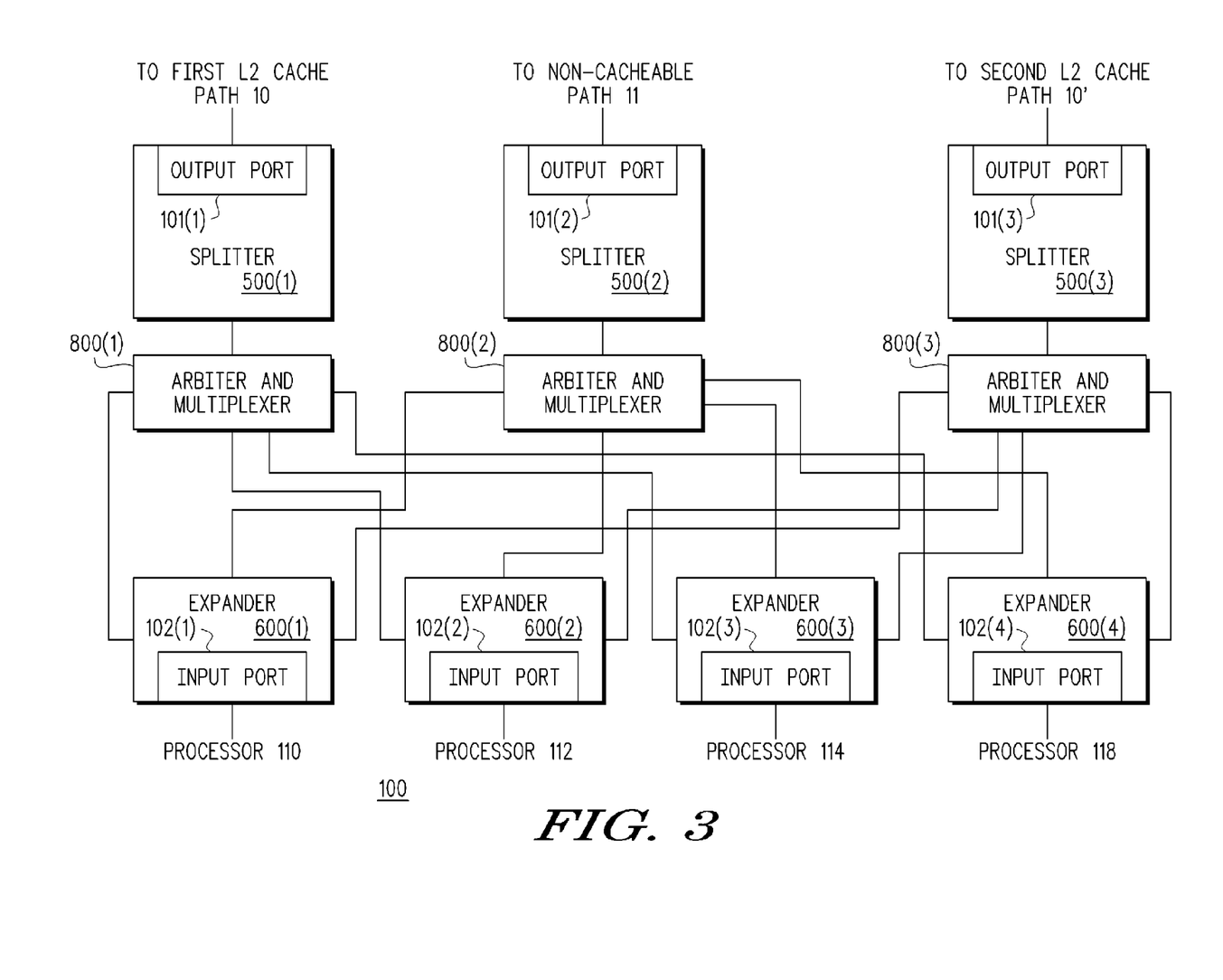
FIG. 3 illustrates a first modular interconnect that belongs to the multi-port modular cache unit according to an embodiment of the invention.

FIG. 3 illustrates a first modular interconnect 100, according to an embodiment of the invention. First modular interconnect 100 interconnects between four processors 110, 112, 114 and 118 and three paths (10, 10' and 11). Accordingly, the first modular interconnect 100 includes four three-output expanders 600(1)-600(4), three arbiter and multiplexers 800(1)-800(3) and three splitters 500(1)-500(3). By allocating an arbiter and multiplexer per path the first modular interconnect can perform a per-path arbitration scheme. Arbitrator and multiplexers 800(1)-800(3) can operate concurrently.

Each expander out of expanders 600(1)-600(4) is connected to each of the arbitrator and multiplexers 800(1)-800(3). Expander 600(1) is also connected to processor 110. Expander 600(2) is also connected to processor 112. Expander 600(3) is also connected to processor 114. Expander 600(4) is also connected to processor 118. Each of arbiter and multiplexers 800(1)-800(3) is connected to a single corresponding splitter 500(1)-500(3). Splitter 500(1) is also connected to the first cache path 10. Splitter 500(2) is also connected to the non-cashable path 11. Splitter 500(3) is also connected to the third cache path 10'.

Figure 4:
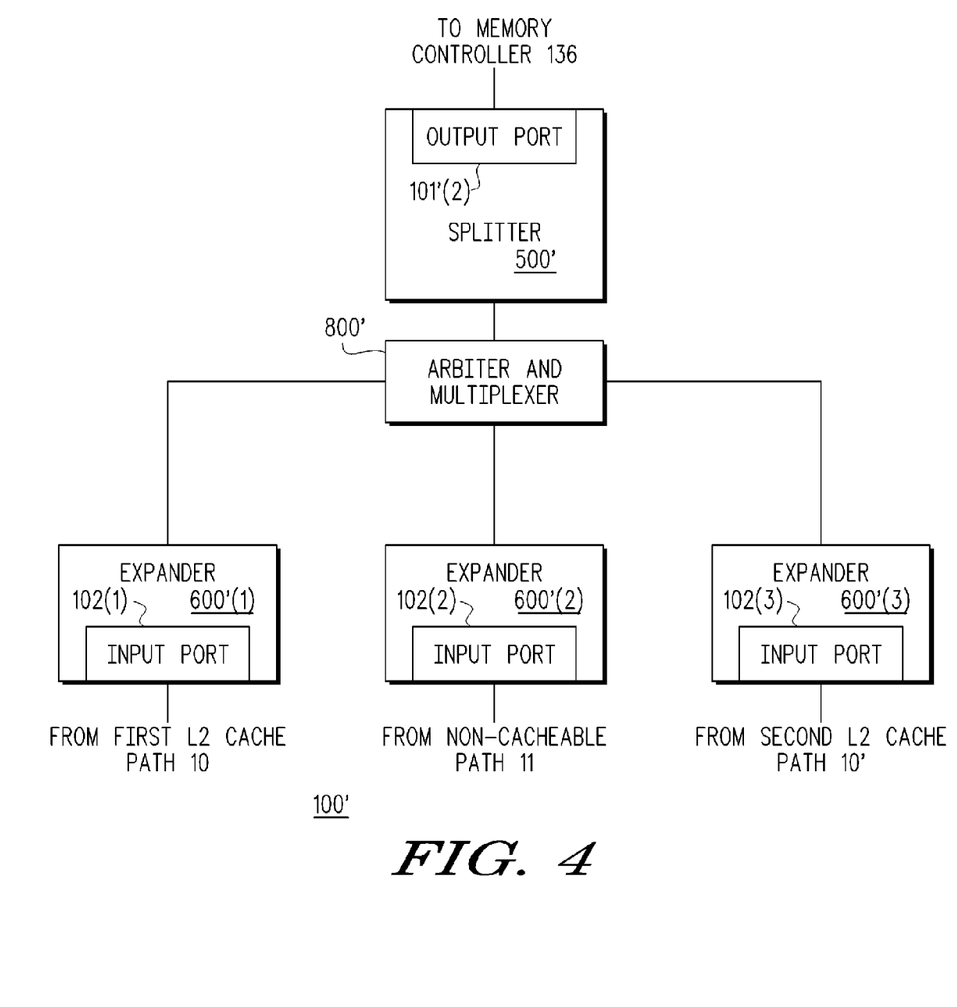
FIG. 4 illustrates a second interconnect that belongs to the multi-port modular cache unit, according to an embodiment of the invention.

FIG. 4 illustrates a second modular interconnect 100', according to an embodiment of the invention. Second modular interconnect 100' interconnects between three paths (10, 10' and 11) and a single memory controller 136. Accordingly, the second modular interconnect 100' three single-output expanders 600'(1)-600'(3), a single arbiter and multiplexer 800' and a single splitter 500'. The arbiter and multiplexer 800' is connected between splitter 500' and expanders 600'(1)-600'(3).

It is noted that if the second modular interconnect 100' was connected to multiple memory controllers then it should include multiple arbiter and multiplexers and multiple splitters.

Figure 5:
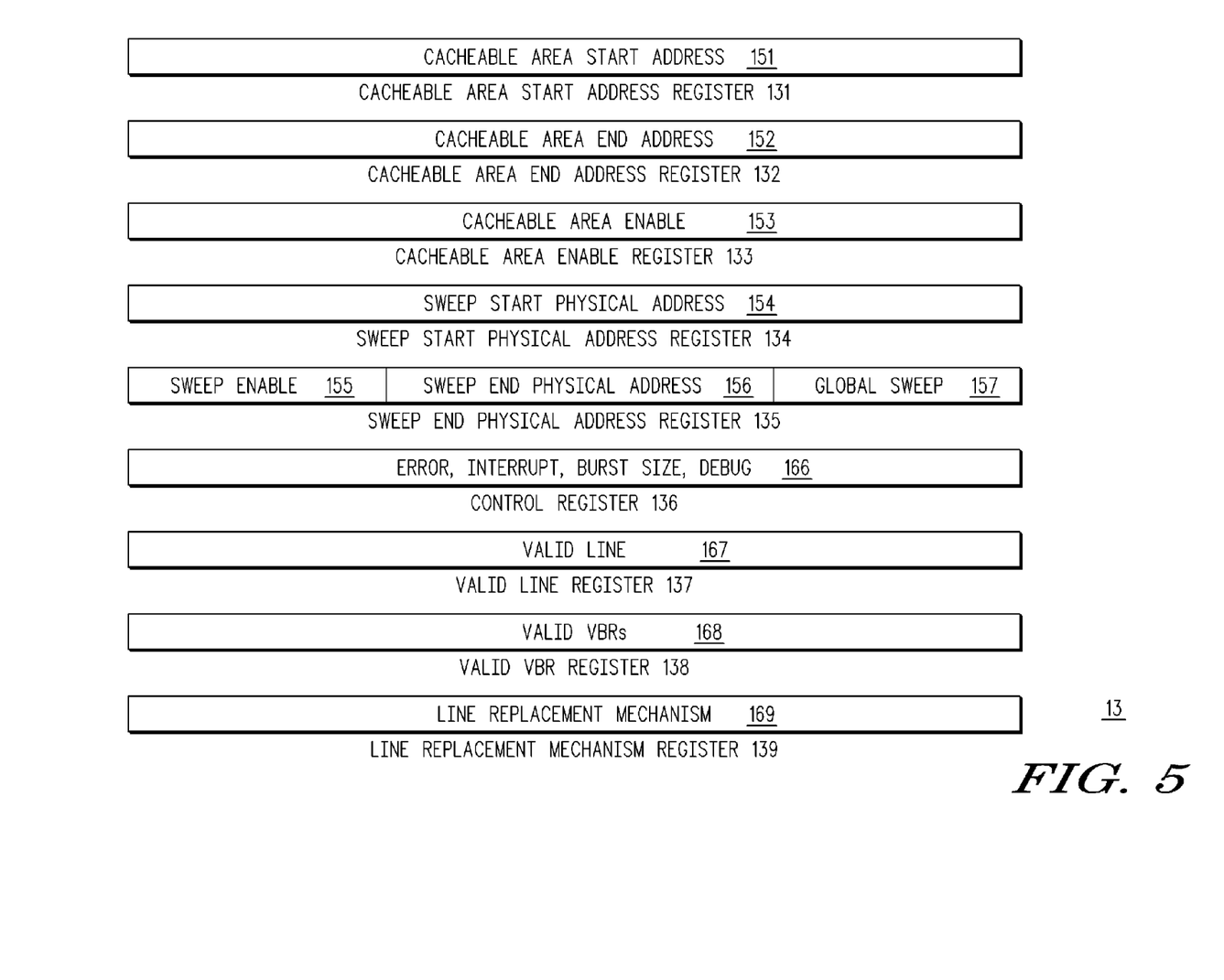
FIG. 5 illustrates a register file according to an embodiment of the invention.

FIG. 5 illustrates register file 13, according to an embodiment of the invention.

Register file 13 includes multiple registers, and some registers are illustrated for convenience of explanation. These registers include cacheable area start address register 131, cacheable area end address register 132, cacheable area enable register 133, sweep start physical address register 134, sweep end physical address register 135, control register 136, valid line register 136, valid VBR register 138, and line replacement mechanism register 139.

The register file 13 allows to define a cacheable area, to determine the limits of a sweep operation, determine line replacement mechanism, indicate a validity of a whole memory entry, the validity of each VBR within a memory entry, enable error interrupts, enable debugging, determine the burst size towards the higher level memory and the like.

The cacheable area start address register 131 stores a cacheable area start address field 151 that indicates the start address of a cacheable memory area. The cacheable area end address register 131 stores a cacheable area end address field 152 that indicates the start address of a cacheable memory area. The cacheable area enable register 133 stores a cache enable field 153 that determines if the cacheable area option is enabled.

The sweep start physical address register 134 stores a sweep start physical address field 154 that indicates that start physical address of a sweep operation. The sweep end physical address register 135 stores a sweep enable field 155, a sweep end physical address field 156 that indicates that start physical address of a sweep operation and a global sweep field 157 that indicate whether to sweep the whole memory. A sweep operation involves invalidating a range of entries, typically by setting corresponding invalidity flags.

The control register 136 stores various error, interrupt, burst size and debug fields 166. The valid line register 136 stores a valid line field 167 that indicates if a whole memory entry (of 256 bytes) is valid. The valid VBR register 138 indicates the validity of each group of bytes within a memory entry. The line replacement mechanism register 139 stores a line replacement mechanism field 169 that indicates which line replacement mechanism is used.

Figure 6:
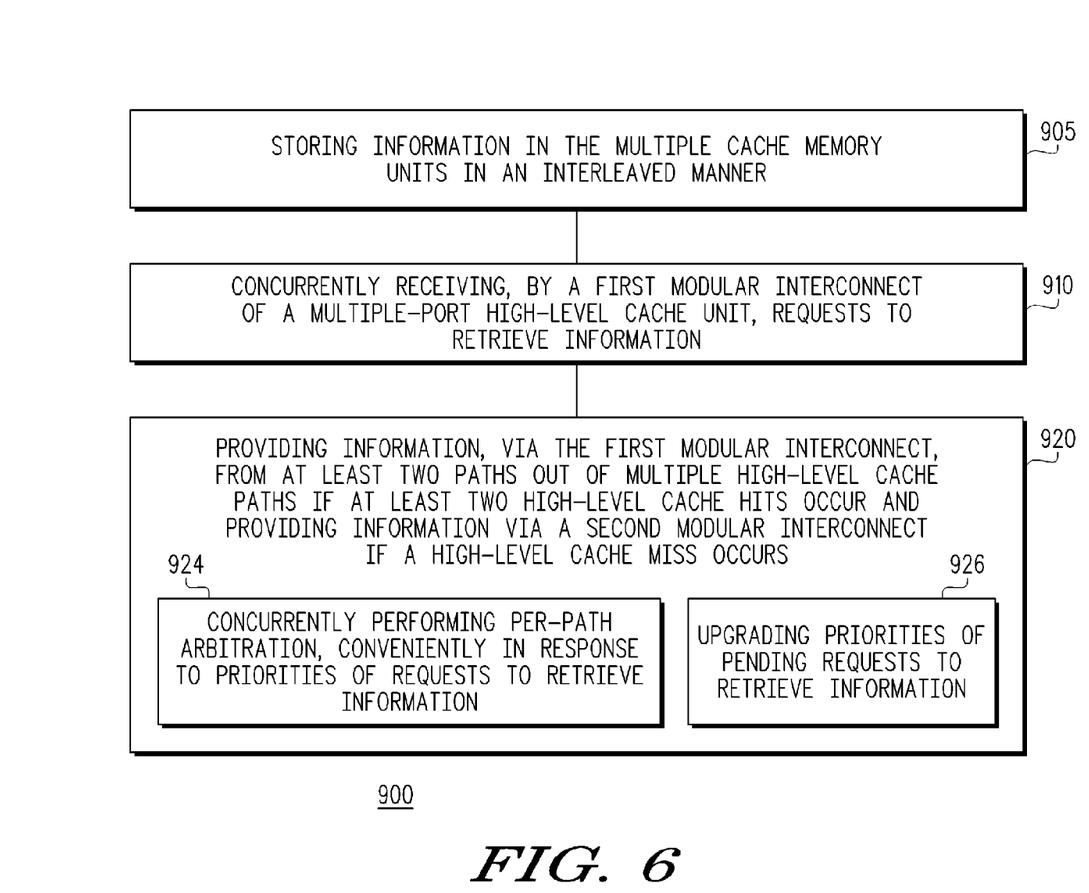
FIG. 6 illustrates a method for retrieving information from a cache according to an embodiment of the invention.

FIG. 6 illustrates method 900 for retrieving information from a multi-port high-level cache unit, according to an embodiment of the invention.

Conveniently the high-level cache unit is a level two cache unit but this is not necessarily so.

Method 900 starts by stage 905 of storing information in the multiple high-level cache units in an interleaved manner.

Stage 905 is followed by stage 910 of concurrently receiving, by a first modular interconnect of a multiple-port high-level cache unit, multiple requests to retrieve information.

Stage 910 is followed by stage 920 of providing, via the first modular interconnect, information from at least two paths out of multiple high-level cache paths if at least two high-level cache hits occur and providing information, via a second modular interconnect, if a high-level cache miss occurs.

Conveniently, if two concurrently received requests to retrieve information are aimed to the same path then one will be serviced before the other.

Conveniently, if the multiple requests to retrieve information are aimed to different high-level cache paths then they can be serviced in parallel.

Conveniently, if all the requests request information that is stored in these different high-level cache paths then multiple high-level cache hits occur and the information can be provided substantially simultaneously via the first interconnect.

Conveniently, stage 920 also includes providing information via a second modular interconnect if at least one information request is a non-cacheable information request. The information conveniently also passes through the first modular interconnect.

Conveniently, stage 920 includes determining whether to access a high-level cacheable path or a non-cacheable path in response to at least one pre-defined cacheable address range.

Conveniently, stage 920 includes stage 924 of concurrently performing per-path arbitration. Conveniently, the per-path arbitration is responsive to a priority of information requesters.

Conveniently, method 900 also includes stage 926 of priority upgrading of pending requests to retrieve information. Stage 926 can occur before stage 924, after stage 924 or in parallel to stage 924.

Figure 7:
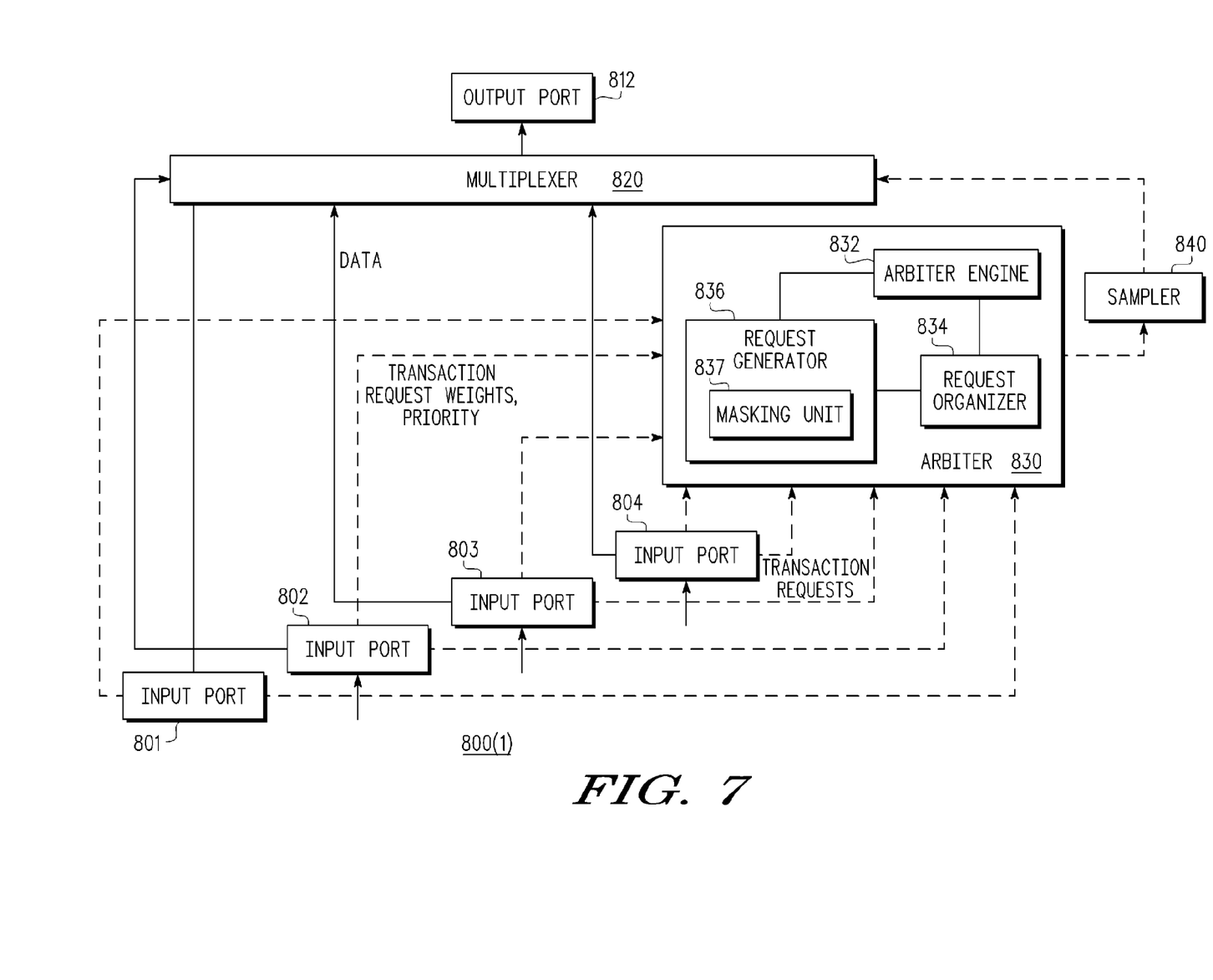
FIG. 7 illustrates a multiplexer and arbiter according to an embodiment of the invention.
Figure 8:
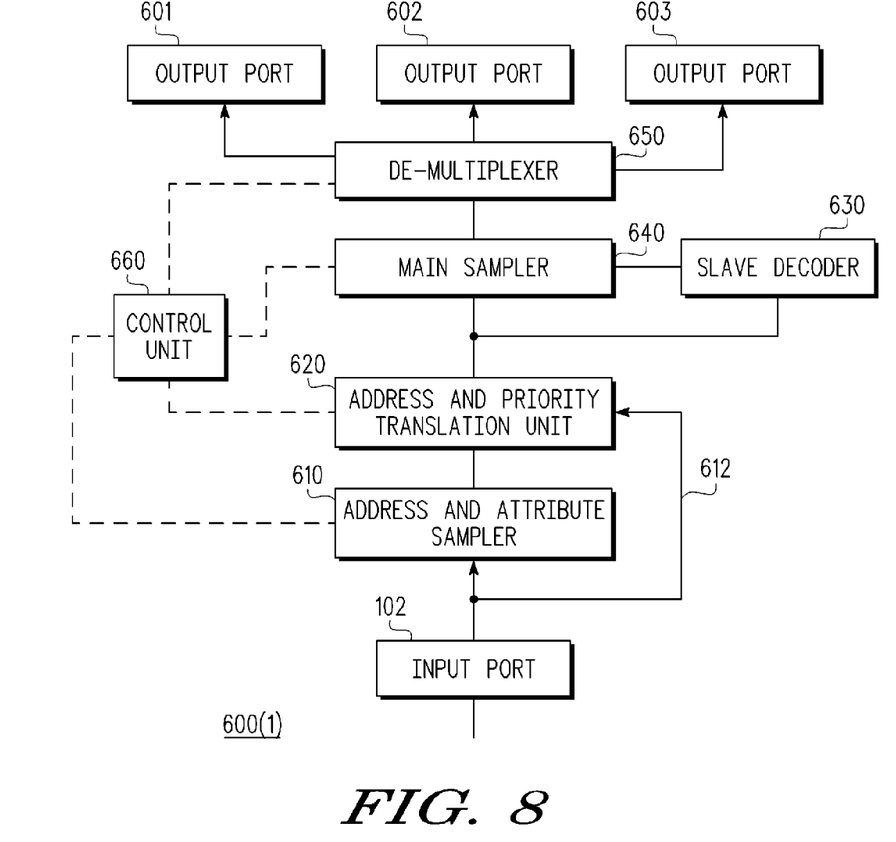
FIG. 8 illustrates an expander according to an embodiment of the invention.
Figure 9:
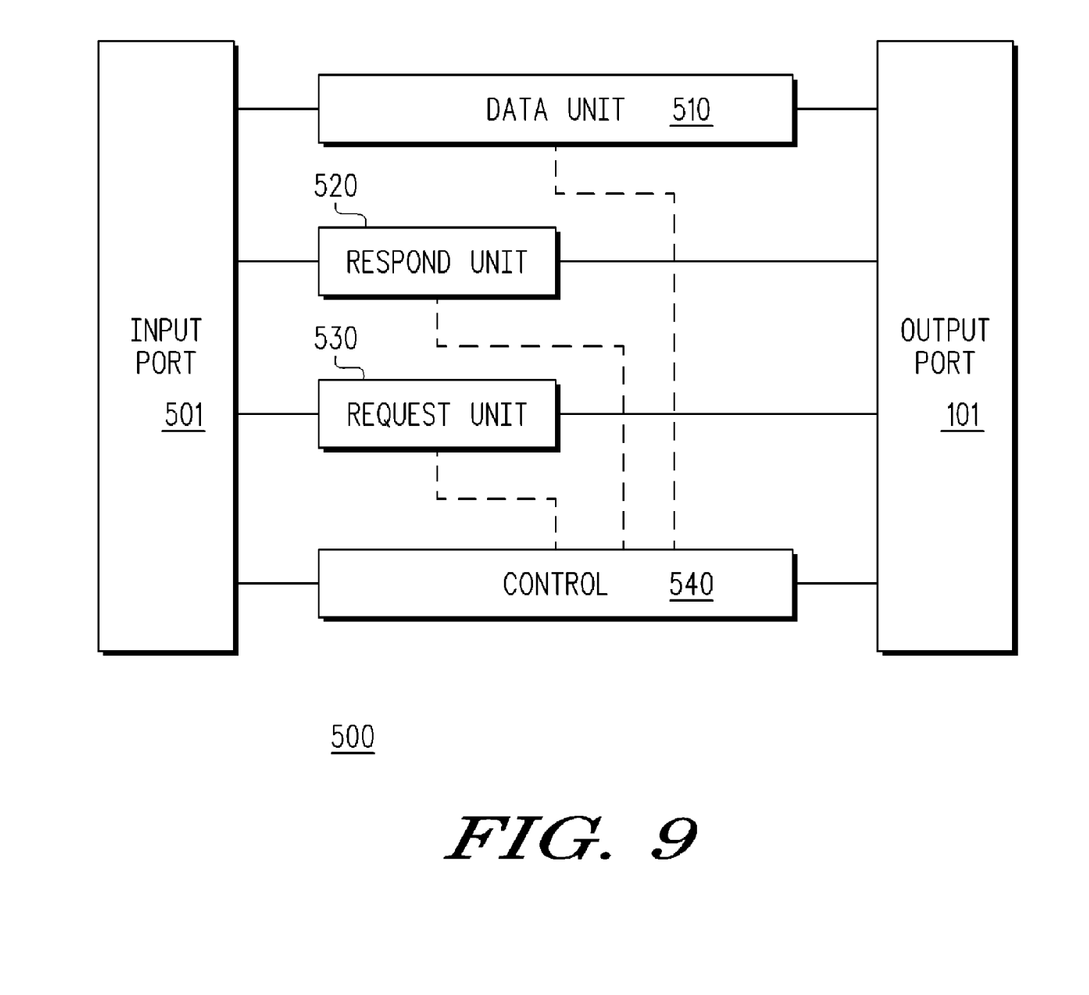
FIG. 9 illustrates a splitter according to an embodiment of the invention.

FIG. 7-9 illustrate in better details various modular interconnect components, such as arbiter and multiplexer 800', expander 600(1), and splitter 500'. First and second modular interconnects 100 and 100' are modular. Each modular interconnect can be designed using these modular interconnect components.

According to an embodiment of the invention each of these modular interconnect components uses the same standard interface, such as to facilitate a glue-less connection between each of these components.

According to another embodiment of the invention each modular interconnect component can alter various attributes of various pending data retrieval requests. For example, various data retrieval requests can be associated with an arbitration priority that can be upgraded. Each modular interconnect component can upgrade the priority of the data retrieval request it stores, either in response to a request from another component or even apply a time based priority upgrade scheme.

Conveniently, at least one modular interconnect component can receive and generate signals that represent the beginning and/or end of the following phases: request and address phase, a data phase and an end of data retrieval phase.

Conveniently, at least one modular interconnect component can store one or more data retrieval request and also support multiple pending data retrieval requests that are stored in other components. For example, the expander 600 can receive up to sixteen data retrieval requests that were not followed by data phases and/or end of data retrieval phases, although it can store a more limited amount of requests.

According to an embodiment of the invention multiple modular components out of components 500-800 includes a sampling circuit that can be selectively bypassed by a bypass circuit.

Each modular interconnect component of the first modular interconnect 100 has a standard, point-to-point, high performance interface. Each master and slave is interfaced via that interface. These interfaces use a three-phase protocol. The protocol includes a request and address phase, a data phase and an end of data retrieval phase. Each of these phases is granted independently. The protocol defines parking grant for the request and address phase. The data phase and the end of data retrieval phase are conveniently granted according to the fullness of the buffers within the modular interconnect 100. The request is also referred to as data retrieval request. The end of data retrieval phase conveniently includes sending an end of data retrieval (EOT) indication.

The expander 600(1) sends the data retrieval request to the appropriate arbiter and multiplexer. The selection is based upon the address of the requested information and optionally on the relationship between that address and at least one cacheable memory range.

When the data retrieval request wins the arbitration and when the multiplexer and arbiter receives a request acknowledge signal then expander 600(1) sends the data it received to the splitter. Once the transmission ends the expander 600(1) enters the end of data retrieval phase. The selected splitter then executes the three-staged protocol with the target slave.

Conveniently, the first modular interconnect 100, and especially each arbiter and multiplexer out of 800(1)-800(4) implements an arbitration scheme that can be characterized by the following characteristics: multiple (such as four) quality-of-service (or priority) levels, a priority upgrade mechanism, priority mapping, pseudo round robin arbitration, time based priority level upgrade, priority masking, weighted arbitration, and late decision arbitration.

The priority level is an attribute of each data retrieval. The arbiter includes a dedicated arbiter circuit per priority level. The priority upgrade mechanism allows a master (or another component) to upgrade a priority level of a pending data retrieval, based upon information that is acquired after the generation of that data retrieval request. The upgrade involves altering the priority attribute associated with the data retrieval request. The update can be implemented by the various components of the modular interconnect.

According to an embodiment of the invention some data retrieval requests can be labeled as non-upgradeable, while other data retrieval requests can be labeled as upgradeable. Non-upgradeable data retrieval requests are not upgraded during priority upgrade sessions.

Priority mapping allows mapping processors priority levels to paths priority levels or to a common priority level mapping. Pseudo round-robin arbitration involves storing the last arbitration winner and scanning a data retrieval request vector from the last arbitration winner until a current data retrieval request is detected.

Time based priority level upgrading includes updating the priority level of pending data retrieval requests in response to the time they are pending. Conveniently, this feature reduces the probability of starvation. According to an embodiment of the invention a predefined timing threshold T1 is defined. When half of T1 passes the priority level is upgraded. When another fourth of T1 passes the priority level is further upgraded. When another eighth of T1 passes the priority level if further upgraded. Those of skill in the art will appreciate that other time based priority level upgrading schemes can be applied without departing from the scope of the invention.

Priority masking includes selectively masking various requests of predefined priorities, during predefined time slots. Conveniently, during one time slot the highest priority data retrieval requests are masked, during another timeslot the highest and the second highest priority data retrievals requests are blocked, and so on. Conveniently, some data retrieval requests cannot be blocked, and during various time slots all the data retrieval requests are allowed. This guarantees a minimal arbitration winning slots for data retrievals with lower priorities, thus resolves potential starvation problems.

Weighted arbitration includes allowing an arbitration winner to participate in multiple consecutive data retrievals (data retrieval sequence) after winning an arbitration session. The weight can represent the amount of data retrievals that can be executed by an arbitration winner. Conveniently, if during the data retrievals sequence a higher priority data retrieval request wins the arbitration scheme then the data retrieval sequence stops.

Late decision arbitration includes determining a new arbitration winner substantially at the end of currently executed data retrieval or substantially after a delay corresponding to the length of the current data retrieval ends.

First modular interconnect 100 is an ordered interconnect thus is does not require area-consuming re-order buffers. Conveniently, first modular interconnect 100 is synthesized within a bounded centralized area generating star topology. This synthesis may require to add a small amount of buffers between first modular interconnect 100 and the master and slaver that are connected to it. Nevertheless, this synthesis dramatically reduces the complexity of routing and further shortens the design and verification period.

First modular interconnect 100 has a relatively small area resulting in relatively low static power consumption. In addition, by applying power-gating techniques the power consumption of first modular interconnect 100 is further reduced.

First modular interconnect 100 includes multiple point-to-point interfaces (also referred to ports) that inherently implement sampling. In addition first modular interconnect 100 includes multiple sampling circuits that can be selectively bypassed, thus preventing low frequency filtering problems arising from long paths.

First modular interconnect 100 supports an ordered data retrieval protocol. In addition, to simplify implementation and eliminate reorder buffers, first modular interconnect 100 does not generate data retrieval towards a new slave till all pending data retrieval towards that slave are completed. This behavior ensures that the order of data retrieval completion is the same of the order of data retrieval initiated. As a result the actual latency towards a certain slave may increase due to additional stall cycles.

FIG. 7 illustrates multiplexer and arbiter 800(1), according to an embodiment of the invention.

Multiplexer and arbiter 800(1) receives requests to retrieve information (via fours expanders 6001(1)-600(4)) that originate from four processors 110-118. The four expanders are the masters of multiplexer and arbiter 800(1) and splitter 500(1) is the slave of multiplexer and arbiter 800(1).

Splitter 500(1) can split a request to receive information, and especially a request to receive information from multiple cache entries (for example a burst) to multiple requests.

Multiplexer and arbiter 800(1) includes multiple input ports 801-804, output port output ports 812, an atomic stall unit 810, multiplexer 820, arbiter 830 and sampler 840. The atomic stall unit 810 receives data retrieval requests from various masters that are aimed to the same slave. Sampler 640 samples the arbitration result. It is connected between the multiplexer 820 and the arbiter 830.

The arbiter 830 receives the data retrieval requests from the atomic stall unit 810, master arbitration priority and master weights, a late arbitration control signal, and provides to the multiplexer 820 the arbitration winner and an indication that a data retrieval starts. The data retrieval start indication is responsive to a data retrieval acknowledgement signal sent from the splitter. The multiplexer 820 also receives the data retrieval requests and in response to the control signal from the arbiter 830 selects one of the pending data retrieval requests to be outputted to the splitter 500.

The arbiter 830 includes an arbiter engine 832, a request organizer 834 and a request generator 836.

The request organizer 834 receives the data retrieval requests and their priority level and generates multiple request vectors, each vector represents the data retrieval requests that belong to a certain priority level. Each vector indicates the masters that sent pending data retrieval requests.

The request generator 836 includes a masking unit 837 that selectively masks various data retrieval request of predefined priorities, during predefined time slots. For example, assuming that four priority levels exist, and that sixteen timeslots are defined. During two time slots the highest priority data retrieval requests are masked and the corresponding request vector is null. During two other time slots the two highest priority data retrieval requests are masked and the two corresponding request vectors are null. During one time slot only the lowest priority level data retrieval requests are enabled and during the other time slots all the data retrieval requests are unmasked.

The request generator 836 also applies the weighted arbitration and the late decision arbitration, by sending to the arbiter engine 832 timing signals that indicate when to perform an arbitration cycle. For example, the request generator can receive an indication about the size of a data burst and the size of the data beat and determine when to trigger the next arbitration cycle. The request generator 836 is aware of the priorities of the pending data retrieval requests and can request an arbitration cycle if a higher priority request has arrived during a long data retrieval of a lower priority data retrieval request.

The request generator 826 also sends control signals such as master request signal and slave acknowledge signal in order to implement the three phase protocol.

The arbiter engine 832 includes multiple arbitration circuits, each associated with data retrieval requests that belong to the same priority level. The arbitration winner is the highest unmasked data retrieval request that won an arbitration cycle within the arbitration circuit.

The arbiter engine 832 receives multiple request vectors, each vector represents the data retrieval requests that belong to a certain priority level. Each vector indicates the masters that sent pending data retrieval requests. The arbiter engine 832 applies a pseudo round robin arbitration scheme that takes into account only the winner of the last arbitration cycle.

Those of skill in the art will appreciate that other arbitration schemes, including well know arbitration schemes can be applied.

FIG. 8 illustrates an expander 600(1), according to an embodiment of the invention.

Processor 110 is the master of expander 600(1) and arbiter and multiplexers 800(1)-800(3) are the slaves of expander 600(1). Each arbiter and multiplexer is associated with a unique path out of paths 10, 10' and 11. Expander 600(1) directs requests to retrieve information from path 10 to arbiter and multiplexers 800(1), directs requests to retrieve information from path 11 to arbiter and multiplexers 800(2) and directs requests to retrieve information from path 10' to arbiter and multiplexers 800(3).

Expander 600(1) includes input port 102, multiple output ports 601-603, an address and attribute sampler 610, an address and priority translation unit 620, slave decoder 630, main sampler 640, de-multiplexer 650 and control unit 660.

The address and attribute sampler 610 can be bypassed. If it is not bypassed it samples the address and attributes lines.

Expander 600(1) supports priority upgrades of data retrieval requests that are stored in it. Thus, a priority attribute of a stored data retrieval request can be updated. The updated priority is taken into account by arbiters and multiplexers 800(1)-800(3). The upgrade can usually take place before the slave that is the target of the data retrieval acknowledges the data retrieval request.

The main sampler 640 includes a double buffer for all lines from the master to the slave (including address, write data and attribute lines). The double buffer allows sampling address, writing data and attributing lines of certain data retrieval before another data retrieval ends. The main sampler 640 provides a single buffer for the lines from the slave to the master (including, for example, read data).

The main sampler 640 facilitates data retrieval priority upgrading and also time based priority upgrading. Time based priority upgrade involves increasing a priority of a pending transport request that is pending for more than a certain time threshold. Conveniently, multiple data retrieval priority upgrades can occur if the pending period exceeds multiple time thresholds.

The priority upgrading is conveniently initiated by a master and includes upgrading the priority of a certain pending data retrieval request (by altering the priority attribute). Conveniently, the priority attribute of other data retrieval requests that precede that certain data retrieval requests are also upgraded. This feature allows maintaining the order of requests while increasing the probability that a certain pipelines data retrieval request will be serviced before lower priority data retrieval requests. Conveniently, the controller 660 can control this priority upgrade, but this is not necessarily so.

The address and priority translation unit 620 translates the upper bits of the address according to predefined values. The priority translation involves translating master data retrieval priority levels to a slave data retrieval priority levels to common priorities levels. The translation can involve using a predefined data retrieval priority lookup table.

The slave decoder 630 receives an address over address lines and determines whether the data retrieval is aimed to a which path out of paths 10, 10' and 11 or if the address is erroneous, based upon a predefined address range that is associated with each path.

According to one embodiment of the invention the address ranges that are allocated to each path are unique so that only one slave can be selected.

Conveniently, the cacheable address range is stored in the register file 13, and the memory addresses of paths 10 and 10' are interleaved.

The de-multiplexer 650 sends data, address and attribute signals to the arbiter and multiplexer 800 that is connected, via a splitter 500, to the target path.

The control unit 660 controls the operation of the address and attribute sampler 610, address and priority translation unit 620, path decoder 630, main sampler 640 and the de-multiplexer 650. The control unit 660 can control power-gating techniques, and block data retrieval requests aimed to a certain target slave until a current data retrieval that is aimed to that certain target slave is completed. The data retrieval completion can be indicated by an end of data retrieval signal that is sent from the target slave.

Conveniently, the control unit 660 includes an access tracker, request generator, end of data indication generator and a data retrieval type tracking circuitry. The access tracker tracks data retrievals that did not end. The request generator sends data retrieval request signals towards target slaves. The end of data indication generator sends EOD indication towards the master. The data retrieval type tracking circuitry stores information that indicates the type (read, write, error, idle) of data retrievals that are currently during their data phase.

FIG. 9 illustrates a splitter 500', according to an embodiment of the invention.

Memory controller 136 is the slave of splitter 500' while arbiter and multiplexer 800' is the master of splitter 500'. Splitter 500' is adapted to receive data retrievals requests from the master and convert them to one or more data retrieval requests towards the slave. Splitter 500' stores various slave data retrieval characteristics (also referred to as attributes), such as maximal burst size, data burst alignment, wrap size, and the like. It then defines the translations towards the slave in response to these attributes. Splitter 500' also applies the three stage protocol towards the slave and towards the master. For example, if a master sends a data burst of 128 bits and the slave can receive data bursts of 32 bits then splitter 500' converts this data burst to four slave data bursts.

Splitter 500' can be configured to be responsive to the slave data retrieval attributes (optimize mode) or as a sampling stage (sampler mode). In the sampler mode splitter 500' only samples signals and sends them towards the slave. It is noted that the bus width of the input port and output port of splitter 500' are the same, thus sampling mode can be easily executed.

Splitter 500' includes a data unit 510, a respond unit 520, a request unit 530 and a control/debug unit 540. The control/debug unit 540 controls the splitter and is also used during debug mode.

It is noted that other modular component of first modular interconnect 100 includes a debug unit and/or a combined debug and control unit but for simplicity of explanation only FIG. 9 illustrates a debug unit.

The data unit 510 includes buffers that enable to exchange data between the master and slave. The respond unit 520 manages the end of transmission signal and the end of data signals. The request unit 530 performs the access optimization and manages other control signals.

Splitter 500' can store multiple data retrieval requests, and includes one sampling circuit as well as an optional sampling circuit that can be bypassed. The second sampling circuit is located within the request unit 530. Conveniently, two sampling circuits are activated when splitter 500' wrap is enabled, or when splitter 500' operates in an optimize mode.

Conveniently, when a write data retrieval occurs, the master sends a data burst to splitter 500'. The master also sends information reflecting the size of the burst, so that splitter 500' can send an EOD signal towards the master once it received the whole data burst and the master-splitter data phase ends. It can also send an EOT signal once the master-splitter end of data retrieval phase ends. The EOD and EOT can be sent even if the data was not sent (or was not completely sent) to the slave. Splitter 500' sends data to the slave in one or more data beats, and used the three-stage protocol. The slave sends to splitter 500' EOD and EOT signals once the splitter-slave data phase and the splitter-slave data retrieval end phase are completed.

According to an embodiment of the invention splitter 500' can also support data retrieval priority upgrading and also time based priority upgrading. These features can be required if splitter 500' is followed by an arbiter.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A device comprising:
 a plurality of processors, each processor coupled to a corresponding one of a plurality of level-one caches; and
 a multi-port high-level cache unit comprising:
  a plurality of paths, including at least two concurrently accessible interleaved cache paths and at least one non-cacheable path;
  a first modular interconnect comprising a plurality of splitters, a plurality of arbiter/multiplexors, and a plurality of expanders, wherein:
   each splitter of the plurality of splitters includes an output connected to an input of a corresponding one path of the plurality of paths and an input connected to a corresponding one arbiter/multiplexor of the plurality of arbiter/multiplexors, each splitter to receive information retrieval requests and to convert each request into one or more cache accesses based on request attributes associated with each request;
   each arbiter/multiplexor of the plurality of arbiter/multiplexors includes a plurality of inputs, each input of the plurality of inputs connected to an output of a corresponding one expander of the plurality of expanders, each arbiter/multiplexor to provide an information retrieval start indication and to receive an information retrieval acknowledgement signal from an associated splitter; and
   each expander of the plurality of expanders includes an input connected to a corresponding one of the plurality of processors, each expander to receive information retrieval requests from the corresponding one processor and to provide priority upgrading of the information retrieval requests;
  a second modular interconnect including a plurality of inputs, each input connected to an output of a respective one of the plurality of paths;
  a memory controller connected to an output of the second modular interconnect; and
  a memory connected to the memory controller.

2. The device according to claim 1 wherein the first modular interconnect is adapted to concurrently receive requests to retrieve information, and in response provide information from at least two paths out of multiple high-level cache paths if at least two high-level cache hit occurs, and provide information, via the second modular interconnect, if a high-level cache miss occurs.

3. The device according to claim 1 further comprising a cacheable address range register that defines a cacheable address range.

4. The device according to claim 1, wherein the multi-port high-level cache unit is coupled to M processors and to a S higher level memory units; wherein the multi-port high-level cache unit comprises K paths wherein the first modular interconnect comprises M expanders, K arbiter/multiplexers and K splitters; and wherein the second modular interconnect comprises K expanders, S arbiter/multiplexers and S splitters.

5. The device according to claim 1, wherein each cache path is coupled to at least one gasket to provide protocol conversion.

6. The device according to claim 1, wherein the first modular interconnect is a non-blocking full fabric switch that supports per-path arbitration.

7. The device of claim 1 wherein each expander of the plurality of expanders is operable to direct information retrieval requests from an associated processor of the plurality of processors to each path of the plurality of paths.

8. The device of claim 7 wherein priority upgrading comprises increasing a priority of an information retrieval request pending for more than a predetermined time threshold.

9. The device of claim 1 wherein each arbiter/multiplexer of the plurality of arbiter/multiplexers is operable to select a pending information retrieval request based on priority information associated with the pending request.

10. The device of claim 1 wherein the information retrieval start indication is responsive to the information retrieval acknowledgement signal.

11. The device of claim 1 wherein the request attributes include maximal data burst size information or data burst alignment information.

12. The device of claim 1 wherein the second modular interconnect comprises:
 a splitter including an output connected to the memory controller;
 an arbiter/multiplexer including an output connected to the splitter; and
 a plurality of expanders, each expander of the plurality of expanders having an output connected to a corresponding input of the arbiter/multiplexor and an input connected to an associated one path of the plurality of paths.

13. The device of claim 12 wherein the splitter is operable to receive information retrieval requests from the arbiter/multiplexer and convert each request into one or more data retrieval requests to be provided to the memory controller, the conversion based on stored retrieval characteristics including maximal data burst size information or data burst alignment information.

14. The device of claim 12 wherein the arbiter/multiplexer is operable to receive information retrieval requests from each of the plurality of paths and select a pending request based on an arbitration policy.

15. A method comprising:
 receiving a first request of a plurality of information retrieval requests at a first modular interconnect including a plurality of expanders, a plurality of arbiter/multiplexers, and a plurality of splitters, the plurality of requests provided by a plurality of processors, each processor coupled to a respective one expander of the plurality of expanders, wherein receiving the first request comprises receiving the first request at an input of a first expander of the plurality of expanders, the first expander to provide priority upgrading of the first request;

providing the first request, from an output of the first expander, to each arbiter/multiplexer of the plurality of arbiter/multiplexers including a first arbiter/multiplexer, the first arbiter/multiplexor to provide an information retrieval start indication and receive an information retrieval acknowledgement signal from a first splitter of the plurality of splitters;

providing the first request from the first arbiter/multiplexer to the first splitter, the first splitter and the first arbiter/multiplexer associated with a corresponding one path of a plurality of paths, the plurality of paths including at least two cache paths included at a multiple-port high-level cache unit and at least one non-cacheable path;

providing the first request, from the first splitter, to a first path of the plurality of paths; and receiving, concurrently, information from the at least two cache paths if at least two cache hits occur, and receiving information, via a second modular interconnect, if a high-level cache miss occurs.

16. The method according to claim 15 further comprising receiving the information via the second modular interconnect if at least one information request is a non-cacheable information request.

17. The method according to claim 16 further comprising determining that an information request is non-cacheable in response to at least one pre-defined cacheable address range.

18. The method according to claim 15, wherein providing the first request from the first arbiter/multiplexer is responsive to a priority associated with the first request.

19. The method according to claim 18 further comprising upgrading the priority of the first request at the first expander.

20. The method according to claim 15, further comprising storing information at a cache path in an interleaved manner.

* * * * *